May 24, 1966  K. KUCHENBECKER  3,252,445
FEEDING GUARD
Filed Nov. 13, 1963  3 Sheets-Sheet 1
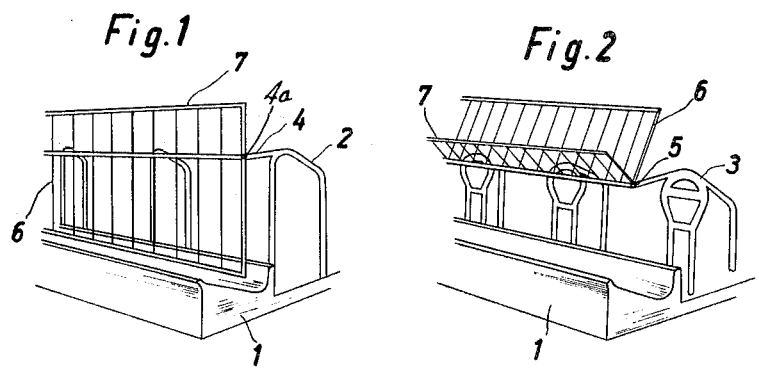
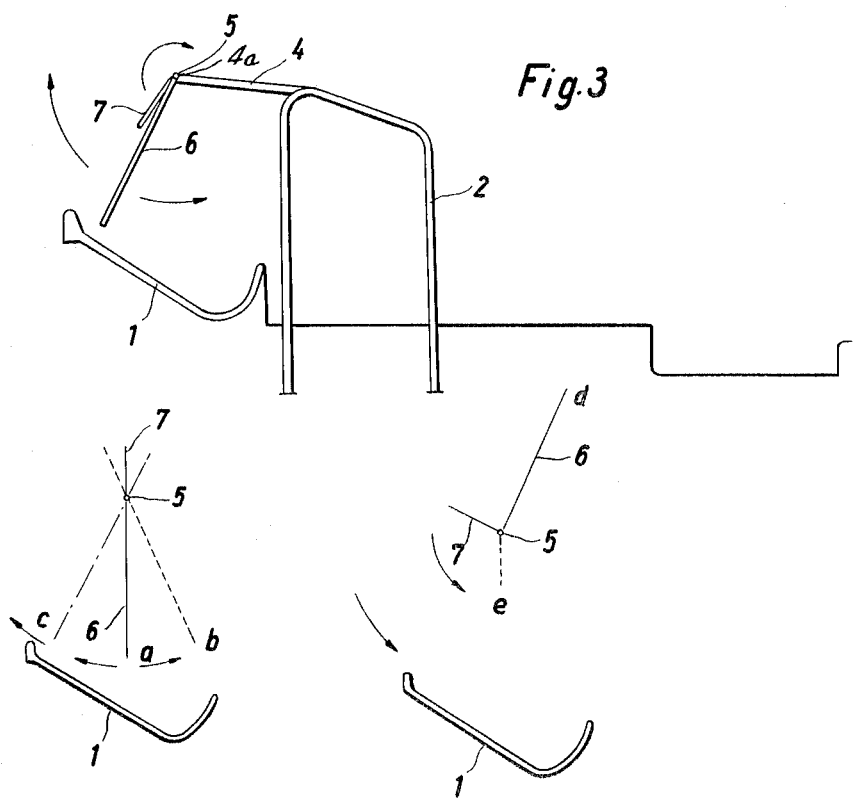
Inventor:
KARL KUCHENBECKER
By Robert W. Beach
ATTORNEY

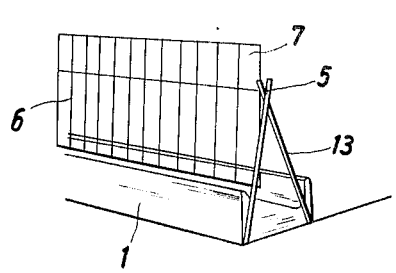
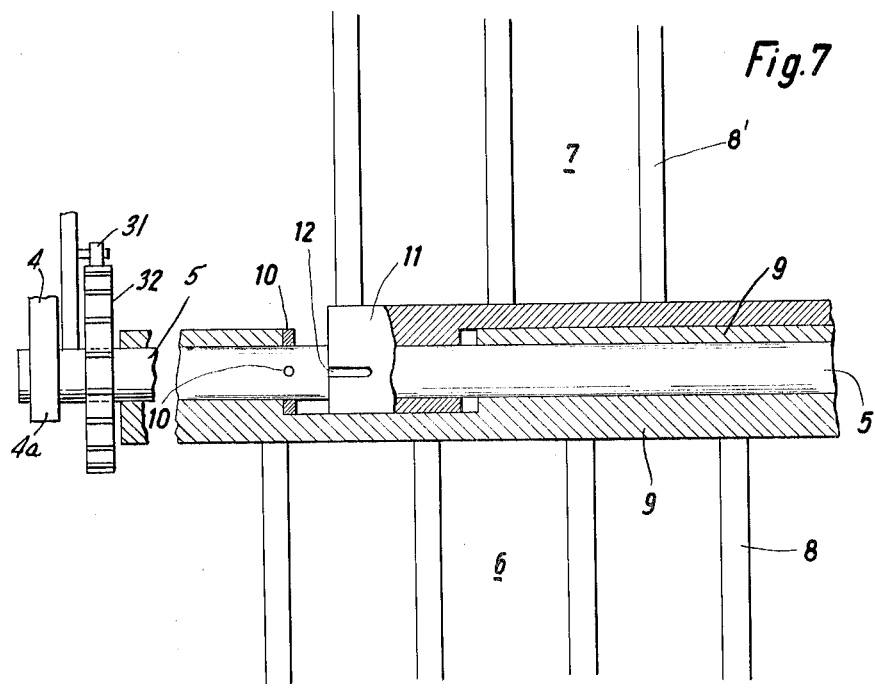

Inventor:
KARL KUCHENBECKER
By Robert W. Beach
ATTORNEY

United States Patent Office 3,252,445
Patented May 24, 1966

3,252,445
FEEDING GUARD
Karl Kuchenbecker, Zuckerberg 29, Trier, Germany
Filed Nov. 13, 1963, Ser. No. 323,432
Claims priority, application Germany, Nov. 19, 1962,
K 48,260; Sept. 18, 1963, K 50,858
6 Claims. (Cl. 119—59)

The present invention relates to agricultural stable equipment and more particularly to a feeding guard which is mounted in the vicinity of a feeding trough and serves for screening the stalls of the animals from the feeding trough or feeding passage.

Such feeding guards are frequently used for preventing stabled animals, especially cattle, from reaching the feeding trough or feeding rack except during feeding time. During this time, these known feeding guards are opened so that the animals can feed, preferably separately and without disturbing each other. It is also known to provide such rigid feeding guards with separate feeding racks which permit the animals at the same time to be fed with beets or the like from the feeding trough and with hay from the feeding rack.

On many farms or in other agricultural establishments it has been found advisable to use the stables during different seasons of the year for different animals, for example, for cattle as well as for pigs or sheep. This results in considerable economic advantage since the stable area can then always be fully utilized. Thus, for example, in summer when the cattle remain outside in the pasture, the stable may be used for raising pigs. Such a multipurpose use of the stable also has the advantage that the agricultural operation may be quickly changed in accordance with changing market conditions.

For the mentioned purpose of utilizing the stable for different animals which are kept in stalls and held in place by the conventional feeding guards, it has already been proposed to provide the upper half of the feeding guard with openings which may be closed up, while the lower half has unchangeable feeding slots and may be tilted upwardly about a horizontal axis relative to the upper part in the direction toward the feeding passage. Such a feeding guard has, however, the disadvantage that it requires a complete reconstruction of the stable and that it can therefore not be employed if the stable is already equipped with means for tethering the animals in any other manner.

In order to permit such stables in which the cattle are either tethered by chains or neck yokes, or simple pens, open stables or the like to be used for different purposes, the present invention provides a feeding guard for stables for screening off the feeding trough or the feeding passage from the stable area, which comprises a grate wall that is rotatable about an axis located above and parallel to the trough and may be locked in any position to which it is turned. This axis of rotation may extend through the plane of the grate wall so as to divide it into two equal or unequal parts which may be swiveled relative to each other and locked in different adjusted positions. It is for this purpose advisable to mount above the trough a horizontal shaft which carries a main grate and an auxiliary grate which are either rigidly connected to each other or may be swiveled relative to each other. Such a feeding guard may be easily installed also in such stables in which previously there have been no means for screening off the stable area from the feeding passage and in which the animals are tethered individually.

The shaft carrying the grate which forms the feeding guard may be rotatably mounted either on extensions of the stands forming the stalls, or on stable posts, stable walls, or other mounting means, or also on special supporting stands or the like. Each of the grate parts consists of several parallel grate rods which are secured within a frame. It has been found very advisable to make the auxiliary grate of approximately one half of the height of the main grate. The main grate should be adjustable to, and adapted to be locked in at least three positions, and the auxiliary grate should be designed so as to permit it to be tilted relative to the main grate so as to extend either in the same direction as the main grate or at a right angle thereto.

According to a modification of the invention, the grate wall may be additionally provided with a secondary grate which may be swiveled through an angle of 360° about an axis which extends parallel to the grate wall.

Preferably the secondary grate is rotatably mounted on lateral arms which are connected to the upper part of the grate wall, and the secondary grate may also be removable from the grate wall. The axis of rotation of the secondary grate is preferably located near its center so as to permit it to be swiveled very easily. The secondary grate should also be provided with means to permit it to be locked to the grate wall in a position in which the secondary grate and the upper part of the grate wall extend at an angle to each other so that both together may form a feeding rack.

The above-mentioned as well as further features and advantages of the present invention will become more clearly apparent from the following detailed description thereof which is to be read with reference to the accompanying drawings, in which—

FIGURE 1 is a perspective view of a stall with a feeding guard according to the invention;

FIGURE 2 is a similar view of a slightly different stall, which is also provided with a feeding guard according to the invention, but with the latter in a different position;

FIGURE 3 is a side view of a stall and the feeding guard;

Figure 8:
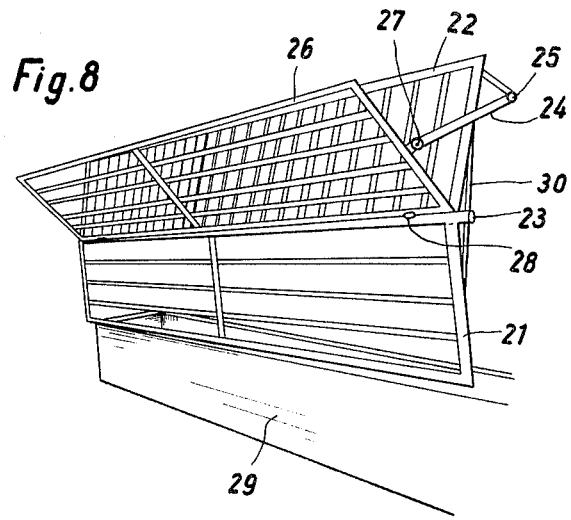
Figure 9:
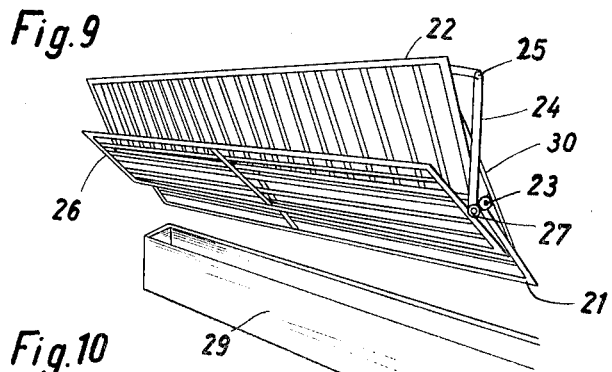
Figure 10:
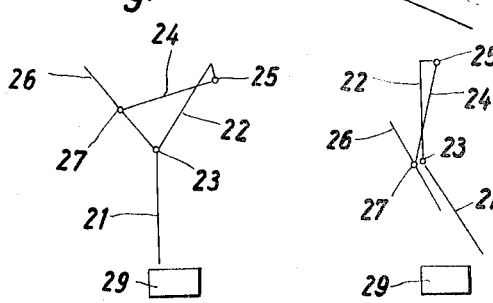
Figure 11:
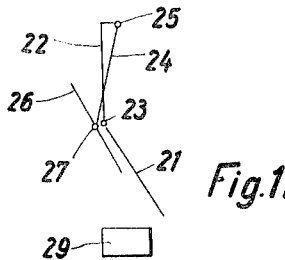

FIGURES 4 and 5 indicate diagrammatically several preferred positions of the new feeding guard;

FIGURE 6 is a perspective view of a feeding guard mounted on a separate supporting stand;

FIGURE 7 is a partial cross section on an enlarged scale of the shaft with the main and auxiliary grates thereon;

FIGURE 8 is a perspective view of a modified type of the feeding guard in a position in which the animals can reach the feeding trough and the secondary grate and the upper part of the grate wall form a feeding rack;

FIGURE 9 is a view similar to FIGURE 8 of the same feeding guard but in another position in which the feeding trough is shut off from the stall of the animals and the secondary grate rests against the grate wall;

FIGURE 10 shows diagrammatically the position of the feeding guard according to FIGURE 8; while FIGURE 11 shows diagrammatically the position of the feeding guard according to FIGURE 9.

As illustrated in FIGURES 1 to 3, the stalls for the animals consist of a feeding trough 1 having a filling side at the left and a stock-feeding side at the right and posts 2 or 3 forming the lateral limitations of each stall. In FIGURES 1 and 3, these posts 2 are of a simple construction, while in FIGURE 2 they are of a stronger construction with three legs, as used especially for tethering bulls.

These posts 2 or 3 are provided with arms 4 which extend toward the feeding trough and carry a horizontal shaft 5 which is rotatably mounted on the ends 4a of these arms 4. This horizontal shaft 5 carries a feeding guard which consists of main grate 6 and an auxiliary grate 7. Both grates may consist of a plurality of parallel vertical rods 8 which are combined into a unit by a frame 9.

According to the modification as illustrated in FIGURE 6, shaft 5 carrying the feeding guard 6, 7 is rotatably mounted on a separate stand 13 which is necessary whenever the stall is not provided with posts or similar means on which the feeding guard may be mounted or when the feeding guard should be easily movable from one place to another.

By rotation about shaft 5 within a range of 360°, it is possible to swing the feeding guard 6, 7 about the axis of such shaft to any desired position above the feeding trough 1. Thus, for example, in FIGURE 1 the main grate 6 is turned vertically downward, while in FIGURE 2 it is turned obliquely upward, and in FIGURE 3 it is turned slightly upward toward the feeding passage.

The auxiliary grate 7 is mounted on shaft 5 so as to permit it either to be connected to the main grate 6 to extend in the same plane but in the direction opposite the latter (FIGURE 1) and to be swung conjointly with the main grate, or to permit the auxiliary grate to be adjusted to different positions relative to the main grate so as to extend for example, at a right angle to the main grate, as indicated in FIGURE 2.

A preferred manner of mounting the main and auxiliary grates on the shaft 5 is illustrated in FIGURE 7. The main grate 6 is rigidly secured to shaft 5 by means of its frame member 9 which partly encloses shaft 5. Shaft 5 further carries locking pins 10 spaced apart angularly around shaft 5 at right angles as shown in FIGURE 7 which permit the shaft, and thus also the main grate, to be locked rigidly together with the auxiliary grate 7 in each of three angular relationships of 90°, 180° and 270°. For this purpose, a sleeve 11 which carries the auxiliary grate 7 and surrounds the shaft 5 with an axial and circumferential sliding fit is provided with slots 12, also spaced apart circumferentially at right angles to match the spacing of pins 10, in which slots the pins 10 are adapted to engage.

When the auxiliary grate 7 is in the condition as indicated in FIGURE 7, it may be swung relative to shaft 5 and grate 6 to any desired position through an angle of nearly 360°. If it is then shifted so far to the left that the pins 10 engage in slots 12 in sleeve 11, it will be locked against any further swinging movement relative to the main grate in one of the three relationships mentioned above and will then be swung conjointly with the latter during any swinging movement thereof.

One particular advantage of the feeding guard according to the invention is the fact that it considerably facilitates the feeding of cattle in the stable. This will be clearly apparent especially from the diagrammatic sketches of the preferred positions of adjustment of the main and auxiliary grates according to FIGURES 4 and 5. Generally the feeding guard is in the position *a* as shown in FIGURE 4 in which the main grate hangs downwardly. It may be locked in this position or be freely movable. The smaller auxiliary grate is then rigidly connected to the main grate and extends in the same plane in the upward direction. The cattle will be prevented by the auxiliary grate from stepping forwardly and into the feeding trough or toward the feeding passage. Not being able to step out of their stall, they will be quieted generally.

When feeding time comes, the main or lower grate section 6 is swiveled slightly upwardly toward the animal, for example, to the filling position *b*, shown in FIGURE 4, in which the lower grate section is disposed at the stock-feeding side of the trough so that the feeding trough will be entirely free for deposit of feed in it. When hogs are kept in the stall and are to be fed, their feed and swill may then be poured into the feeding trough when the grate is in this position, while when cattle are to be fed, their concentrated feed may be poured into the trough. When the animals should start feeding, the main or lower grate section 6 is swung back to the feeding position *c* at the filling side of the trough which gives the animals full access to the feeding trough. During these swinging movements, the auxiliary or upper grate section is always locked to the main or lower grate section so that such sections are rigidly connected as a straight extension thereof and such sections are therefore swung conjointly. If, however, wet and dry fodder, such as hay, are to be fed to the cattle at the same time, the main grate is tilted upwardly to the position *d*, as shown in FIGURE 5, and the lock between the main and auxiliary grates is released and the auxiliary grate is swung about an angle of 90° relative to the main grate and is then again locked thereto. In this manner, the feeding guard will serve as a hay rack, as shown in FIGURE 2.

After the animals have eaten up their wet fodder, the lock of the auxiliary grate is released and it is turned in a counterclockwise direction down to the position *e* in FIGURE 5. The hay then drops down into the feeding trough 1. Thereafter, the main grate is swiveled back to the basic position *a*, whereby the hay is raked forward toward the animals.

For the health of the animals it is also very important that the feeding guard may be easily swiveled, for example, to the position *b* in which the trough may be easily cleaned without any interference by the animals. The hay may also be placed so high into the hay rack which is formed by the main and auxiliary grates in the position according to FIGURES 2 and 5 that the breath of the animals when lying down will pass underneath it, while when the hay is lying in the feeding trough, their breath will pass above it.

Aside from this application of the feeding guard for stabled cattle, it is of considerable importance also since it permits a cattle stable to be easily converted into a hog or sheep stable. The main grate then serves as a trough guard as is well known, for example, in pigpens. If the stable is also divided up by lateral partitions, smaller pigpens are formed.

It is advisable to construct the new feeding guard so as to extend across the ends of several stalls. In order to facilitate the swiveling of the main grate, it is possible to mount the shaft 5 in roller or ball bearings. Each end of the grate is preferably provided with a control lever which may be provided similarly to a switch lever of a railroad switch with a weight serving as a counterweight to compensate for the weight of the grate. For locking the grate in the different positions, it is possible to provide, for example, a pinion 32 on the end of the shaft into which a hook or pawl 31 may engage which may be pivoted to be swung upwardly.

According to a modification of the invention as shown in FIGURES 8 to 11 the feeding guard includes a grate wall which consists of a lower main grate part 21 and an upper auxiliary grate part 22. These two parts are shown as being rigidly connected to each other or pivotably by means of hinges, and normally they extend to an angle to each other, as indicated particularly in FIGURES 10 and 11. This entire grate wall is mounted so as to be rotatable about its central shaft 23.

Both ends of the upper or auxiliary grate part 22 carry pivots 25 either directly on the upper grate part or supported near it by lateral arms. Links 24 are connected to such pivots by one end. The other ends of these links are pivotably connected to a secondary grate 26 by pivots 27. Such secondary grate may be swiveled about pivots 27 to any position within an angle of 360°. The axis of pivots 27 of this secondary grate is preferably located substantially at the center of such grate.

The grate parts 21 and 22 of the grate wall and the secondary grate 26 may have either vertical or horizontal grate bars. However, they may also consist of frames which carry wire screens or the like.

For supporting the secondary grate 26, the continuous shaft 23 of the grate wall is provided near its ends with short projections 28 forming stops which hold the auxiliary grate in a fixed position relative to the grate 21, 22 when it is tilted as shown in FIGURE 9.

In FIGURE 8, the feeding guard according to this embodiment of the invention is adjusted to a position to enable the animals to feed from the trough 29 as well as from the feed rack which is formed of the upper grate part 22 and the secondary grate 26. The lower grate part 21 of the grate wall then hangs vertically downward over the trough and close to the rear wall thereof, as indicated especially in FIGURE 10, so that the animals can easily reach the trough. FIGURE 10 also shows that the upper grate part 22 is slightly inclined relative to the lower grate part 21 so that, when seen from the side, the feed rack thus formed by the auxiliary grate part 22 and the secondary grate part 26 has a V shape.

When the animals have finished feeding and the feeding trough 29 and the feed rack 22, 26 are to be cleaned, first the grate wall 21, 22 is swung slightly toward the inside so that the lower grate part 21 is tilted slightly upwardly and the upper grate part 22 assumes an approximately vertical position, as indicated in FIGURE 11. The feeding trough 29 is then no longer accessible to the animals and it may be easily cleaned from the side of the feeding passage without any interference by the feeding guard.

Simultaneously with this swiveling movement of the grate wall, the lower edge of the secondary grate 26 is pulled slightly away from the grate wall 21, 22 so as to disengage it from the stop projections 28 so that it will drop downwardly by swiveling about the pivot points 25 and 27 to the position shown in FIGURE 11. All feed which is located on the hay rack then slides downwardly and the hay rack is therefore emptied automatically. As may be seen in the drawings, the secondary grate automatically follows the swiveling movement of the grate wall to any of its positions since it is connected to the upper grate part 22.

As regards the weight distribution, the grate wall including the secondary grate are designed so that the swinging movement of the grate wall as well as the engagement and disengagement of the secondary grate may be carried out very easily. It then only requires a few manipulations to move the feeding guard from a position as indicated in FIGURES 9 and 11 back to a position according to FIGURES 8 and 10 in order to be ready for the next feeding.

The upper and lower parts 22 and 21 of the grate wall may be connected to each other by rods 30 to reinforce the grate structure.

The embodiment of the invention according to FIGURES 8 to 11 employing a secondary grate may, of course, be modified without any substantial change in the function of the feeding guard by shifting the position of the swivel axis 23 of the grate wall 21, 22 to the upper edge thereof.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A stock feeding device for use in a stable comprising a stationary feeding trough having a stock-feeding side and a filling side, a grate including an upper section and a lower section, pivot means connecting said grate upper and lower sections for relative angular adjustment, locking means directly connecting said grate sections for securing them together in any selected one of a plurality of possible relationships adjusted angularly relative to each other to provide a guard or feed rack means, and grate-mounting means adjacent to said pivot means and guiding said grate for swinging of said upper and lower grate sections about an axis extending parallel to and above said feeding trough between a filling position in which said lower grate section is disposed at the feeding side of said trough, blocking feeding access of stock to said trough, and affords access to the filling side of said trough from the side opposite the stock-feeding side for supplying feed to said trough, and a position in which said lower grate section is disposed at the filling side of said feeding trough and said trough is accessible to the stock for feeding, said upper grate section in both of such positions of said lower grate section extending above said lower grate section in generally coplanar relationship thereto to limit movement of livestock toward said feeding trough.

2. The stock feeding device defined in claim 1, in which the pivot means is a horizontal shaft on which both the upper section and the lower section of the grate are mounted.

3. The stock feeding device defined in claim 2, a stand adjacent to the feeding trough and arms rigidly connected to said stand and rotatably mounting the horizontal shaft.

4. The stock feeding device defined in claim 2, and a supporting stand adjacent to the feeding trough supporting at least one end of the shaft.

5. The stock feeding device defined in claim 2, in which the upper and lower sections may be swung relatively around the axis of the shaft into positions disposed substantially at right angles to each other and are held in such relationship by the locking means.

6. The stock feeding device defined in claim 1, in which the lower grate section is of a width transversely of the pivot means approximately twice as great as the width of the upper grate section transversely of the pivot means.

References Cited by the Examiner

UNITED STATES PATENTS 1,481,108   1/1924   Neller _____ 119—63

FOREIGN PATENTS 1,259,254   3/1961   France.
560,405   10/1932   Germany.

SAMUEL KOREN, *Primary Examiner.*

HUGH R. CHAMBLEE, *Examiner.*